Figure 1:
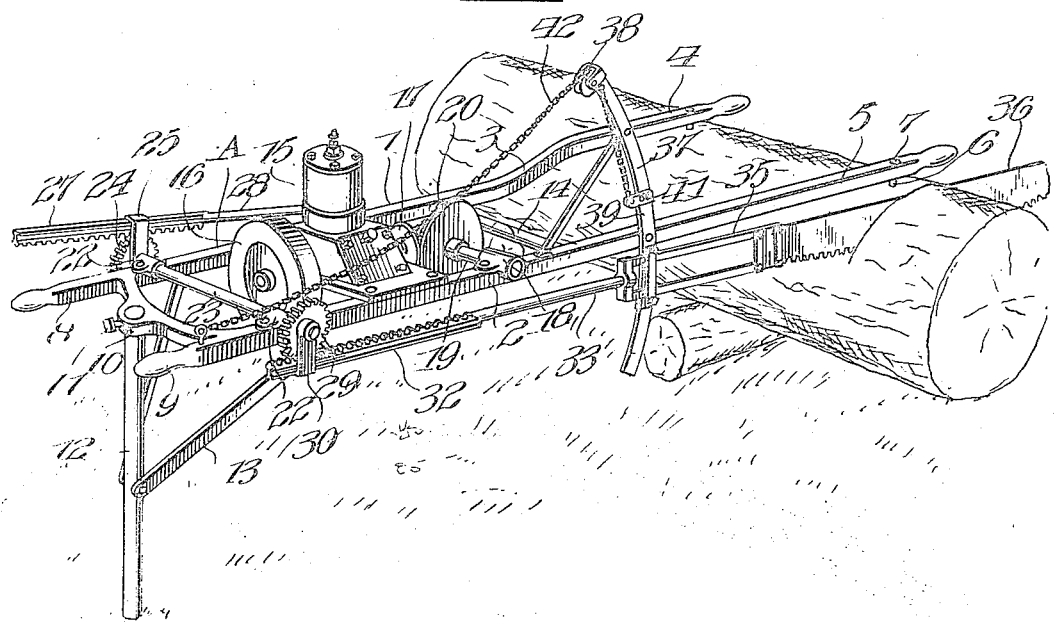

R. BUKER.
POWER TRANSMISSION.
APPLICATION FILED APR. 19, 1912.

1,125,809.

Patented Jan. 19, 1915.
2 SHEETS—SHEET 1.

Witnesses
W. N. Slifer
John J. McCarthy

Inventor
Ray Buker
By Victor J. Evans
Attorney

R. BUKER.
POWER TRANSMISSION.
APPLICATION FILED APR. 19, 1912.
1,125,809.
Patented Jan. 19, 1915.
2 SHEETS—SHEET 2.
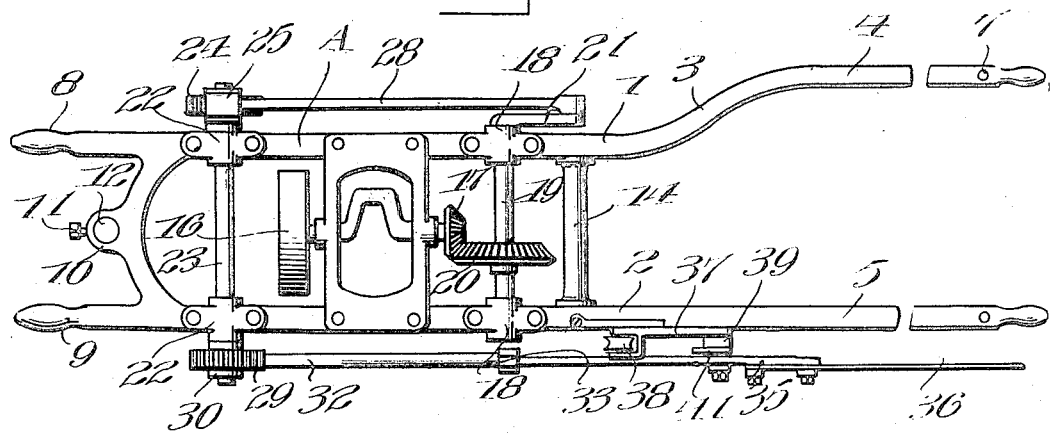
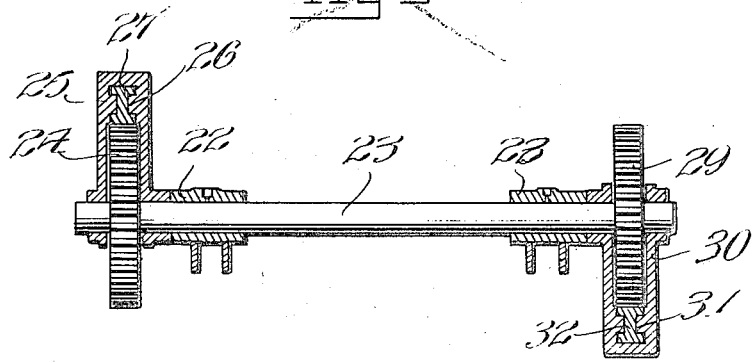
Witnesses
M. H. Miller.
John J. McCarthy
Inventor
Ray Buker
By Victor J. Evans
Attorney

UNITED STATES PATENT OFFICE.

RAY BUKER, OF CASTLEROCK, WASHINGTON.

POWER TRANSMISSION.

1,125,809.   Specification of Letters Patent.   Patented Jan. 19, 1915.

Application filed April 19, 1912. Serial No. 691,794.

*To all whom it may concern:*

Be it known that I, RAY BUKER, a citizen of the United States of America, residing at Castlerock, in the county of Cowlitz and State of Washington, have invented new and useful Improvements in Power Transmission, of which the following is a specification.

This invention relates to power of transmission for sawing machines and has particular application to wood sawing machines of the reciprocating saw type.

In carrying out the present invention, it is my purpose to provide a machine of the character above referred to which may be moved from place to place with ease and facility and which may be securely fastened to and adjusted to the work, for instance a log when it is desired to saw or cut the same.

A further object of my invention is the provision of a motor driven saw wherein by means of a suitable motor and transmission gearing, a reciprocatory motion may be imparted to the saw to enable the latter to cut through the log, or other work.

It is also my purpose to provide a sawing machine wherein the saw may be moved toward and from the wood independently of its movement under the action of the motor and the saw held in propor position in its initial sawing action.

With the above and other objects in view, the invention consists in the construction, combination and arrangement of parts hereinafter set forth in and falling within the scope of the appended claim.

In the accompanying drawings, there has been illustrated one preferred and practical embodiment of this invention, and in these drawings, Figure 1 is a detail perspective view of my improved sawing machine showing the manner of employing the same. Fig. 2 is a top plan view thereof, the motor or driving means being removed. Fig. 3 is a sectional view on the line 3—3 of Fig. 2.

Similar reference characters designate like parts throughout the several views.

In the embodiment of my invention selected for illustrative purposes, I have shown a single cylinder gasolene motor or explosive engine as the driving means of the saw. It is to be understood, however, that any suitable motor possessing the required strength may be utilized, such, for example as an electric motor, hydraulic or air motor, or the equivalent.

Referring now to the accompanying drawings in detail, my improved sawing machine embraces a supporting frame A of substantially U-shape and including the spaced limbs 1 and 2 arranged in parallelism for a portion of their length and one of such limbs, as the limb 1, diverging outwardly of the opposite limb, as at 3, such limbs 1 and 2 forming the relatively spaced arms 4 and 5 respectively. The free extremity of each arm 4, 5, is formed with an aperture and through the aperture is passed the shank 7 of a dog 6, the dog being designed to engage the work to impart rigidity and stability to the supporting frame. Connected to the opposite extremities of the limbs 1 and 2 from the arms 4 and 5, are handles 8 and 9 respectively, and formed on the interconnecting portion of the limbs of the U-shaped supporting frame is an ear 10 provided with a set screw 11 and through which is passed a standard 12 adjustable within the ear 10 and held in the desired adjusted position by means of the set screw 11. Thus the rear end of the supporting frame, that is the end remote from the work, may be raised and lowered, according to the height of the log or other work, to support the frame in a substantially horizontal position, the free extremities of the arms 4 and 5 supporting the opposite end of the frame upon the work. If desired, brace bars 13 may be employed and connected to the lower surfaces of the limbs 1 and 2 of the supporting frame and to the standard 12, the latter connection permitting movement of the standard as and for the purpose aforesaid. A brace bar or strut 14 is also preferably employed and connected to the limbs 1 and 2 of the U-shaped frame at the juncture of the arms 4 and 5 of such limbs.

Mounted upon the limbs 1 and 2 and spanning the same intermediate the lengths of such limbs, is a driving motor 15, shown in this instance to be an explosive engine and upon one end of the crank shaft of such motor is a fly wheel 16 while upon the opposite end of such shaft is a beveled pinion 17. Arranged transversely of the supporting frame and journaled in bearings 18, 18 upon the opposite limbs thereof and upon the side of the motor opposite from the handles 8 and 9, is a transmission shaft 19 provided with a beveled gear 20 meshing with the pinion 17, a crank arm 21 being connected to one end of the transmission shaft 19 beyond the respective bearing 18. Journaled in bearings 22, 22 carried by the limbs 1 and 2 of the U-shaped frame at the side of the motor 15 opposite from the transmission shaft 19, is an actuating shaft 23 adapted to be rotated alternately in reverse directions and receiving its motion or movement from the transmission shaft 19 to reciprocate the saw. Keyed upon one extremity of the shaft 23 beyond one of the bearings 22 is a gear wheel 24; and loosely encircling this extremity of the shaft and embracing the gear wheel 24 is a yoke 25 formed immediately above the gear wheel to provide an I-shaped slot 26. Slidably mounted within the slot 26 is a similarly shaped rack bar 27 formed integral with one end of a pitman 28 the latter having its free end connected to the crank arm 21 on the shaft 19. Thus, in the rotary movement of the transmission shaft 19, a reciprocating motion is imparted to the pitman 28 which motion through the medium of the rack bar 27 and gear wheel 24 is transposed or converted into rotary movement in alternately reverse directions, it being understood that the rack 27 at all times meshes with the gear wheel 24 and is prevented from binding with the said gear, due to the formation of the slot 26 and the similar shape of the rack 27. The opposite end of the shaft 23 beyond its respective bearing, is also provided with a gear wheel 29 keyed thereto in any suitable manner, and loosely encircling this end of the shaft and embracing the gear wheel thereon is a yoke 30 provided with a slot 31 shaped similarly to that hereinbefore described with reference to the yoke 25 and designed to receive an identically shaped rack 32 formed integral with one end of a reciprocating saw carrying shaft 33 which latter extends along the side of the limb and arm 2 and 5 of the U-shaped frame for the major portion of the length of this side of the frame. Fastened to the free end of the shaft 33 is a saw carrying frame 35 composed in this instance of spaced parallel longitudinal bars and transverse end bars connecting the proximate ends of the longitudinal bars of such frame, and to the free end of the frame 35 is fixed, in any suitable manner, a saw blade 36.

Rigidly secured to the arm 5 of the supporting frame is a segmental or arcuate shaped guide strip 37 arranged at right angles to the frame and carrying at its upper free end a guide sheave or roller 38. Mounted for sliding movement upon the guide strip 37 is a similarly shaped saw support 39 provided at an appropriate point with spaced parallel apertures 40, 40 through which pass the longitudinal side members of the frame 35, such members being free to slide within the apertures under the action of the saw carrying shaft 33. Connected to a suitable part of the saw support 39, preferably adjacent to the upper end thereof, is a bracket 41 provided with an eye through which is passed and fastened to one extremity of a chain, cord, cable or the like 42 passed over the guide sheave 38 and terminating in proximity to the handle members of the U-shaped frame so as to be within convenient reach of the operator and whereby the saw may be lowered and elevated, according to the height of the work. Thus, the alternate reverse rotary motions of the shaft 23 are, through the medium of the gear wheel 30 and rack 32, converted into a reciprocatory motion with the effect to reciprocate the saw carrying shaft 33 and consequently impart a reciprocating motion to the saw 36. By means of the guide strip 37 and the saw support 39, the saw may be moved toward and away from the work and held in the desired position in the initial cutting action of the saw, as is obvious.

From the foregoing description taken in connection with the accompanying drawings, the construction, mode of operation and manner of employing my invention will be readily apparent, and while I have herein shown and described one preferred form of my invention by way of illustration, it is to be understood that I do not limit myself to the exact details of construction herein described and delineated, as modification and variation may be made without departing from the spirit of the invention or exceeding the scope of the appended claim.

I claim:

The combination with a power transmission shaft, having a crank arm on one end thereof, of an actuating shaft adapted to be rocked, a gear wheel keyed upon one end of said actuating shaft, a pitman having one end connected to said crank arm, a rack bar I-shaped in cross section formed integral with the opposite end of said pitman and meshing with said gear wheel, a second gear wheel keyed upon the opposite end of said actuating shaft, a reciprocating member, a second rack bar I-shaped in cross section formed on said reciprocating member and meshing with said last gear wheel, whereby in the rotation of said power transmission shaft reciprocating motion is imparted to said last member, and U-shaped yokes having slots corresponding in shape to the cross section of said rack bars loosely mounted on said actuating shaft, the said yokes having their arms disposed parallel with the faces of the gears to prevent side thrust of the latter.

In testimony whereof I affix my signature in presence of two witnesses.

RAY BUKER.

Witnesses:
E. P. BUKER,
GEO. W. ROWAN.